United States Patent [19]

Ball et al.

[11] Patent Number: 4,830,227

[45] Date of Patent: May 16, 1989

[54] DISPENSERS FOR PASTY OR VISCOUS PRODUCTS

[75] Inventors: Martin F. Ball; Ian M. Vokins, both of Wantage, England

[73] Assignee: Metal Box plc, Berkshire, England

[21] Appl. No.: 928,854

[22] Filed: Nov. 10, 1986

[51] Int. Cl.[4] .................... F04B 43/12; G01F 11/02

[52] U.S. Cl. .................... 222/207; 222/209; 222/214; 222/383; 222/386

[58] Field of Search .................... 222/95, 96, 101, 103, 222/105, 207, 209, 214, 256, 257, 259, 260, 340, 341, 321, 383, 386, 391; 251/4, 6, 7, 9; 417/474, 476, 478

[56] References Cited

U.S. PATENT DOCUMENTS

| | | | |
|---|---|---|---|
| 1,596,933 | 8/1926 | Kister et al. | 417/476 |
| 2,113,022 | 4/1938 | Hefti | 222/207 |
| 3,066,832 | 12/1962 | Rossetti | 222/207 |
| 3,881,641 | 5/1975 | Pliml, Jr. et al. | 222/207 |
| 3,930,761 | 1/1976 | Barraclough | 417/476 |
| 4,402,431 | 9/1983 | Wiegner et al. | 222/207 |

FOREIGN PATENT DOCUMENTS

| | | | |
|---|---|---|---|
| 640282 | 3/1962 | Italy | 417/476 |
| 1451325 | 9/1976 | United Kingdom | 222/207 |

*Primary Examiner*—Kevin P. Shaver

*Attorney, Agent, or Firm*—Watson, Cole, Grindle & Watson

[57] ABSTRACT

A dispenser for a pasty or viscous product such as toothpaste is arranged to operate by peristaltic action of an actuator on a deformable member which is backed by an arcuate reaction face. The actuator is mounted for simple pivotal movement to and fro about spigots when a user-engagement member is operated by a user for dispensing and is subsequently released. An integral resilient tongue on the actuator returns the actuator and user-engagement member to their reset positions. For engaging the deformable member, the actuator has a finger portion attached by an integral hinge and arranged to adopt a rigid condition during each forward, dispensing movement of the actuator and a yielding condition during each backward, resetting movement thereof.

12 Claims, 4 Drawing Sheets

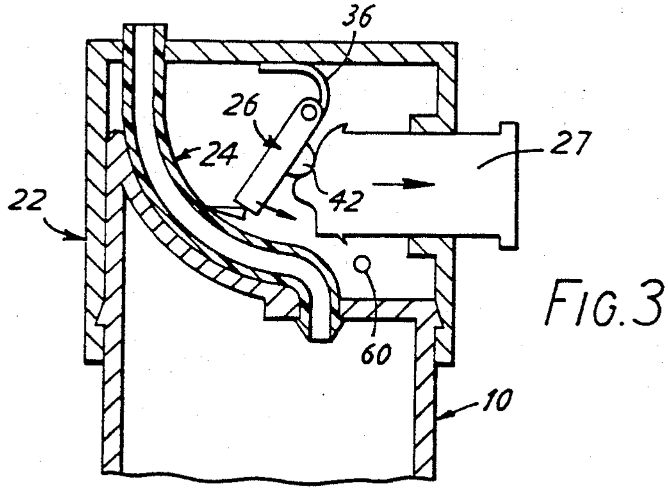
FIG. 3
FIG. 4
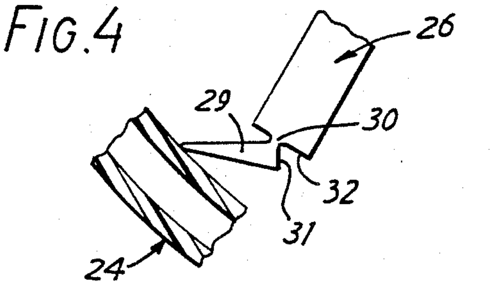
FIG. 7A
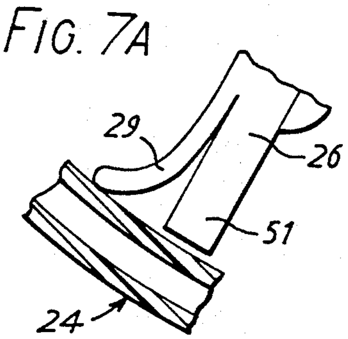
FIG. 7B
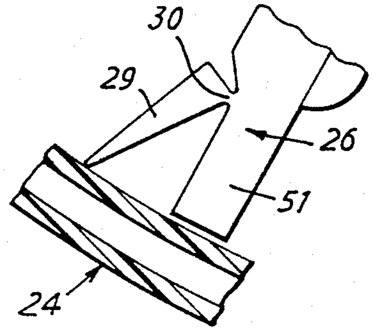

DISPENSERS FOR PASTY OR VISCOUS PRODUCTS

BACKGROUND OF THE INVENTION

1. Field of the Invention

This invention concerns the dispensing of pasty or viscous products such as toothpastes.

2. The Prior Art

Many proposals have been made for essentially plastic dispensers capable of dispensing toothpaste from a dispensing orifice by repeated operation of a user-engageable portion or member such as a flexible diaphragm portion, a piston, a lever or a knurled wheel. Such dispensers may have various advantages over the squeezable tubes in which toothpastes have traditionally been marketed, and lately have met substantial consumer acceptance because, in particular, of their ease of use (particularly their capagility of one-handed operation), their attractive appearance, and their ability to be stood upright on a shelf. In comparison with the more conventional squeeze tubes, however, these dispensers have been expensive, and their market penetration has been correspondingly limited.

The considerable cost of the existing dispensers can largely be attributed to the considerable number, often ten or more, of components of which they are made; these components must be individually manufactured (by injecting-molding, for example, in the case of a thermoplastic component) and later assembled together, and the cost of the dispenser increases generally in proportion to the number of components of which it is made. Thus, there exists a need for a dispenser for pasty or viscous products which is inherently simple and capable of manufacture from a relatively small number of components, and yet which, by suitable arrangement, may to a greater or lesser degree still possess the advantages of the existing commercially available dispensers. Preferably, for corrosion-resistance, the dispenser should also be capable of manufacture solely from thermoplastic materials.

Product dispensers have been proposed having an elongate deformable tube communicating the dispensing orifice with a collapsible or reduceable- volume reservoir of the product. The dispenser has an actuator arranged to operate upon the outer surface of the tube so as, by repeated forward movements towards the orifice whilst pinching the tube closed, to dispense successive metered amounts of the product by what may be considered as a peristaltic action. After each dispensing stroke the actuator is reset, that is, it is returned to its initial starting condition in preparation for the next dispensing operation. Dispensers of this general kind, hereinafter generally to be referred to for brevity as "peristaltic action dispensers," are described and claimed in British Patent Specification No. 1,387,349, U.S. Pat. No. 3,881,641 and European Patent Publication No. EP. 105771 A1.

As these disclosures indicate, however, the peristaltic action dispensers proposed hitherto have again tended to be of complicated construction with a multiplicity of different components, some of which are of metal; they have been generally unsuited to mass production techniques, and their complicated construction has not been consistent with the compact appearance which is desirable, for example, for toothpaste dispensers of 100 cc capacity and typically having an overall length of 175 mm and a diameter of 36 mm. In fact, it is not belived that any commercial exploitation of peristaltic action dispensers of this type has taken place.

SUMMARY OF THE INVENTION

A particular object of the present invention is accordingly to provide a peristaltic action dispenser for pasty or viscous products such as toothpastes, which lends itself to automated production and assembly from a relatively small number of thermoplastic moldings and which may be of a compact design capable of operation with one hand.

Accordingly, the invention provides a peristaltic action dispenser comprising an actuator arranged to contact a resiliently deformable member which at least partially defines a passageway from an inlet orifice to a dispensing orifice for product to be dispensed, wherein (a) the actuator is constrained to undergo generally corresponding but oppositely directed movements for dispensing and resetting, (b) for externally engaging the deformable member the actuator has a finger portion arranged to adopt a rigid condition for each foward movement of the actuator but a yielding condition for each return movement thereof, and (c) in relation to the actuator the deformable member is backed by a reaction face so shaped and located that during a dispensing movement of the actuator the finger portion is caused to pinch closed the passageway and thereafter force product therealong to the dispensing orifice, during a resetting movement of the actuator the finger portion riding yieldingly along the deformable member without causing substantial movement of product in the passageway.

The actuator may be constrained to move translationally or rotationally, or with a combination of translational and rotational movements. It may form part of a unitary dispensing member having a portion which the user operates to dispense product, or alternatively (and as in the first described embodiment) a separate user-engageable member may be provided and arranged to cooperate with the actuator for dispensing.

The actuator is preferably a unitary moulding of a suitable thermoplastic material, the finger portion being integrally attached and of a hinged and/or flexible construction to allow it to yield during the resetting movements of the actuator. In order to provide rigidity for the finger portion during its dispensing movements, the actuator may have an abutment surface with which the finger portion may engage during that time.

In order that the invention may be more fully understood, two embodiments and variations thereof will now be described, by way of example, with reference to the accompanying drawings.

BRIEF DESCRIPTION OF THE DRAWINGS

FIG. 3 similarly shows the top part of the dispenser when a user-engageable member is released following a dispensing stroke;

FIG. 4 is a detail of FIG. 3 to an enlarged scale, showing the bottom end of the actuator and the adjacent part of the deformable tube.

FIGS. 7A and 7B show arrangements of the finger portion of the actuator which are alternative to the arrangement shown in FIGS. 1 to 6.

DETAILED DESCRIPTION OF THE PREFERRED EMBODIMENTS

Figure 1:
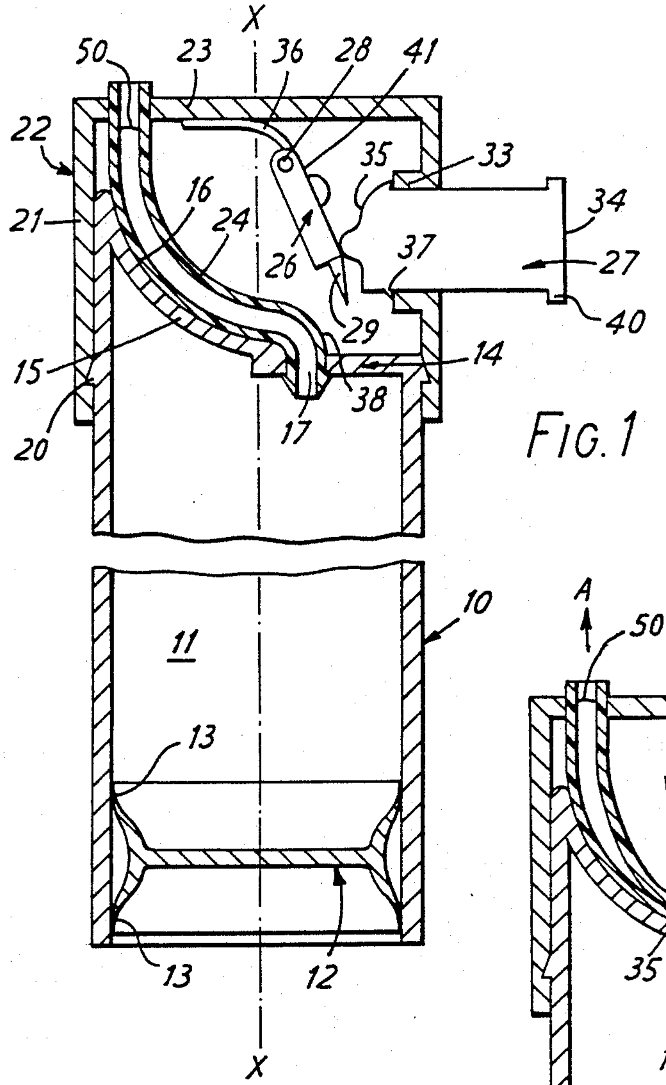
FIG. 1 shows an embodiment of the dispenser in central vertical section and when in its reset condition in preparation for a dispensing stroke.

Referring now to FIG. 1, a toothpaste dispenser has a cylindrical plastic body 10 forming a reservoir for the toothpaste product 11 and open at its bottom end.

The bottom end of the body is closed by a follower plug 12 which is moulded from a suitable thermoplastic material and has flexible integral lips 13 in sealing contact with the bore of the body. In a known manner the plug is driven by atomspheric pressure to follow the product as dispensing progresses; it is in full contact with the product at all times and protects the product against oxidation. In combination with the plug 12 the body 10 forms a reduceable-volume reservoir for the toothpaste.

The top end of the body 10 is generally closed by an integrally formed top end closure 14. This closure includes a ramp formation 15 having an arcuate upper surface 16 which is in generally offset relation to the central axis XX of the dispenser and faces generally inwardly towards the axis XX and upwardly away from the body 10. Adjacent the lower end of the ramp surface 16, that is to say, the end nearest the body 10, the top end closure is formed with an aperture 17 communicating with the interior of the body 10; the aperture 17 therefore constitutes an outlet by which toothpaste may leave the reduceable-volume chamber mentioned above.

Around the periphery of the end closure 14 is formed an outwardly facing bead 20 onto which a skirt 21 of a hollow plastic endpiece 22 of the dispenser is snap-engaged. The endpiece has a top panel 23 to the periphery of which the skirt is attached. The top panel is formed with an aperture through which the dispensing end of an elongate tube 24 of uniform cross-sectional shape and of a suitable deformable and resilient material (e.g., a thermoplastic polymer or elastomer) extends. The bore of the tube 24 forms a passageway for product to be dispensed. The other end of the tube 24 is snap-engaged, adhered or otherwise secured to the aperture 17 in the end closure 14.

Between its ends, the deformable tube 24 lies against, and follows, the arcuate surface 16 of the ramp formation 15, which accordingly forms a reaction face for the tube as will later be understood.

The endpiece 22 provides a mounting for the actuator 26 of the dispenser and also for a finger-engageable member 27 by which the actuator is to be operated by the user. The actuator has the form of a generally plate-like member which is journalled in the endpiece by opposed spigots 28 so as to be pivoted along a horizontal axis adjacent its top edge. The actuator may be made from a moulded plastic material, for example from acetal or polypropylene. A finger portion 29 is carried along the bottom edge of the actuator by an integral or "living " hinge 30 (FIG. 4) allowing free pivotal movement of the finger portion in the clockwise direction in relation to the remainder of the actuator. Pivotal movement of the finger portion in the a counterclockwise direction from the position shown in FIG. 1 is prevented by abutment of the top face 31 (FIG. 4) of the finger portion with the bottom edge 32 of the actuator plate proper.

The finger-engageable member 27 is a hollow plastic element molding having a rectangular cross-section. It is supported for horizontal sliding movement by a guideway 33 moulded into the skirt 21 of the endpiece 22. It has a face 34 outside the endpiece for finger engagement by the user, and a contoured face 35 within the endpiece for engaging a back face 41 of the actuator 26.

The actuator is biassed in a counterclocker direction about its pivotal axis by an integral tongue 36 which is molded to extend from its top edge and which is located in resilient sliding engagement with the underside of the endpiece top panel 23. The biassing force on the actuator is transmitted to the finger-engaging member 27 via its contoured face 35, and serves to urge the member 27 towards the outward, reset position shown, in which the dispenser is ready for operation. This reset position of the member 27 is defined by barbs 37 on the member 27 in engagement with the free end face of the guideway 33 as shown.

The dispenser is operated to dispense product 11 by depressing the finger-engageable member 27 against the bias provided by the tongue 36 of the actuator 26. The leftward (as shown) movement of the member 27 results in a corresponding pivotal movement of the actuator in a clockwise direction about its pivotal axis.

This pivotal movement brings the finger portion 29 into engagement with the top of the tube 24 at the sharp radius or elbow 38 formed where the tube turns down towards the orifice 17 in the top end closure 14 of the dispenser body 10. Following the engagement, further clockwise movement of the actuator causes the finger portion 29 to progressively pinch the tube against the arcuate ramp surface 16 until the tube is pinched closed and toothpaste already in the tube is forced to move along the tube ahead of the finger portion and to be expelled from the free end of the tube as the dispensed product; see the arrow A in FIG. 2.

The pinching closed of the tube by the actuator, and consequently the dispensing of product, is continued through approximately 90° of arc of the actuator movement, at which point a stop 40 on the member 27 engages the skirt 21 of the endpiece 22 to prevent further movement. Thus a metered dose of toothpaste is expelled from the tube 24, and this dose is conveniently made to correspond to the quantity required for an average brushing of the teeth.

From the foregoing it will be understood that the shaping and location of the ramp surface 16 are chosen in relation to the pivotal axis and length of the actuator, so as to achieve the required engagement and subsequent peristaltic operation of the actuator upon the tube as the actuator rotates. A suitable lead-in portion is provided for the elbow 38 of the tube, but otherwise the ramp surface follows a circular locus with the pivotal axis of the actuator as center, its radial spacing from that pivotal axis being equal to, or preferably slightly less than, the effective radial length of the actuator plus twice the tube wall thickness.

Figure 2:
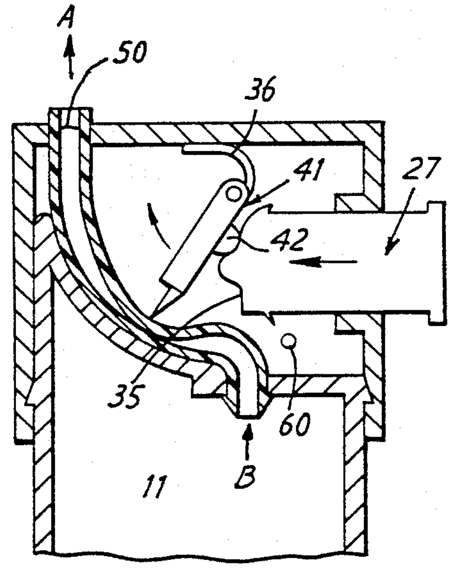
FIG. 2 shows the top part of the dispenser during a dispensing stroke.

This relationship is readily apparent from FIG. 2 showing an intermediate point in the dispensing operation. FIG. 2 also illustrates a further feature of the dispenser, namely that as the actuator moves along the tube 24, the portion of tubing located behind the actuator opens by its own substantial resilience so as to draw in further product from the body 10 as indicated by the arrow B; during this intake of product into the tube, the follower plug 12 moves upwardly to occupy the vacated volume in the body as previously described. Product drawn into the tube in this way during the actuator stroke will form the dose to be metered during the next succeeding stroke of the actuator.

Another feature of the dispenser which is illustrated in FIG. 2 is the manner of engagement of the contoured surface 35 of the finger-engageable member 27 with the back face 41 of the actuator. The actuator has a hemicylindrical boss 42 formed across its face 41 (which is otherwise plane). In co-operation with the contoured surface 35, the boss 42 provides that equal incremental linear movements of the member 27 during the actuator stroke achieve approximately equal incremental angular movements of the actuator and hence approximately equal incremental discharges of product from the tube 24.

Reference is now made to FIGS. 3 and 4. Having dispensed the metered quantity of product as described above, the user releases the member 27, so allowing the resilient tongue 36 to move the actuator 26 and the finger-engageable member 27 back to their reset positions as shown in FIG. 1 in preparation for the succeeding dispensing operation. During a counterclockwise movement of the actuator, its finger portion 29 is caused by the frictional engagement with the tube 24 to pivot in a clockwise sense in relation to the actuator, and this pivotal movement allows the finger portion to ride back along the tube freely and without substantially disturbing the product which has already been drawn into the tube as previously described. A small and desirable backward movement of the product does, however, occur, which is sufficient to cause an abrupt cut-off of product at the dispensing orifice of the tube 24 and to ensure that substantially no product will dribble from the tube while the dispenser is inoperative. The backward movement or "suckback" of the product is apparent in FIGS. 1 and 3 from the position of the free surface or meniscus of the toothpaste, which is indicated by the refernce numeral 50.

As the actuator 26 is moving back to its reset position as shown in FIG. 1, the finger portion 29 passes between a pair of opposed and inwardly projecting restraining pips 60 which for clarity are shown in FIGS. 2 and 3 only. The pips are molded on the inside of the skirt 21, the clearance between them being slightly less then the width of the finger portion. Therefore, at the beginning of the subsequent dispensing stroke the pips 60 will momentarily impede the finger portion and so ensure that it is correctly set for engagement with the tube elbow 38.

The embodiment described above, with particular relation to FIGS. 1 to 4 employs an actuator 26 and a finger-engageable member 27 which are separate. However, such separation is not essential to the invention, and arrangements are possible in which the actuating function and the user-engagement function are provided by a unitary dispensing member. In one such arrangement (non-illustrated) the dispenser described and shown in FIGS. 1 to 4 is modified by replacement of its finger-engageable member 27 by a further plate-like portion which is molded integrally with the actuator so as to project substantially orthogonally from the same adjacent the pivotal axis provided by the spigots 28. The further portion, which thus forms an L-shaped crank with the actuator, extends through a slot formed down the skirt 21 of the endpiece 22 to provide a finger-engageable projection which is accessible to the user for dispensing product. Conveniently, the L-shaped dispensing member is capable, after a dispensing operation, of being latched in a retracted position in which its actuator plate is flush with the top panel 23 of the endpiece (and preferably disengaged from the tube 24), whilst the finger-engageable plate is flush with the endpiece skirt. With such an arrangement the tongue 36 of FIGS. 1 to 4 may be replaced by a similar flexible tongue upstanding from the body 10 above the end closure 14.

It will be understood that with the non-illustrated embodiment of the preceding paragraph as with the embodiment shown in the drawings, the actuator is constrained to undergo generally corresponding but oppositely directed pivotal movements in its forward (dispensing) and reverse (resetting) directions. This use of a common path for both dispensing and resetting is believed to give various advantages and to contribute to the cheapness, reliability and ease of use of the dispenser; in particular, the user is not required to manipulate the actuator to move it in a path for resetting which is different from the path employed for dispensing. The desired asymmetry in the operation of the actuator upon the deformable tube is in each case provided by a finger portion equivalent in function to the finger portions of which the arrangements are shown in FIGS. 1 to 4.

In a further non-illustrated embodiment of the invention employing a unitary dispensing member and a common dispensing and resetting path, the path is substantially linear and defined by a guideway along which the dispensing member is constrained to move. The deformable tube is supported adjacent and generally parallel to this path by a reaction face corresponding in function to the surface 16 of the arrangement previously described and shown. The reaction face is linear except for an arcuate lead-in portion corresponding to that backing the elbow 38 in the tube of the embodiment previously shown; in a modification, however, the reaction face is wholly linear and the path defined for the dispensing member is made non-linear at the beginning of the dispensing stroke. Instead of being essentially linear the common path of the dispensing member may be part-circular or otherwise arcuate, or it may be a combination of arcuate and linear portions.

So far the passageway has been described in terms of the bore of an elongate tube 24, as shown in FIG. 1. This tube has been laid against a separate arcuate surface 16 of a ramp formation 15, against which the tube is pinched by the actuator 26 to move the product in the tube towards the dispensing end of the tube. A number of alternative constructions of passageways are shown in FIGS. 5A–5C.

Figure 5A:
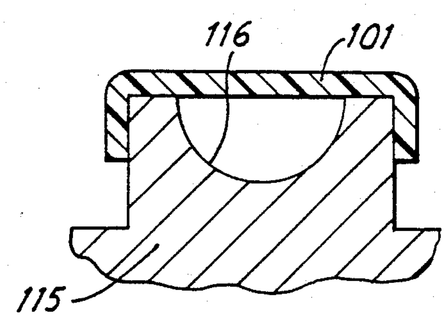
FIGS. 5A to 5C are sectional views of alternative constructions of passageway.

In FIG. 5A the passageway, which is shown in axial cross-section, is formed from a sheet of membranous material 101 which is sealably affixed to a ramp formation 115 which is provided with a surface 116 of grooved cross-section. If the ramp formation 115 is provided with a generally arcuate lateral profile, similar to that shown for the ramp formation 15 in FIGS. 1 to 3, it will be appreciated that by providing the end of the finger portion 29 of the actuator with a profile matching that of the groove provided in the surface 116, in this case a U-shaped profile, it will be possible for the finger portion to pinch the membranous sheet 101 against the surface 116 to provide a pumping action similar to that of FIGS. 1 to 3. The membranous material, which may for example, be a thermoplastics polymer or elastomer, may be affixed to the ramp formation by any suitable means, such as for example by bonding.

Figure 5B:
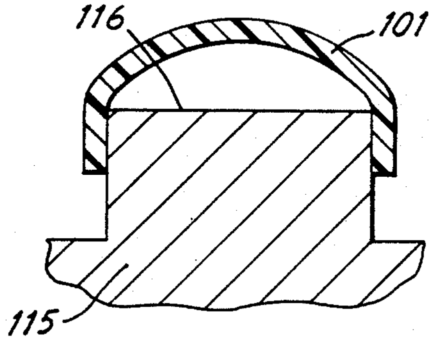
Figure 5C:
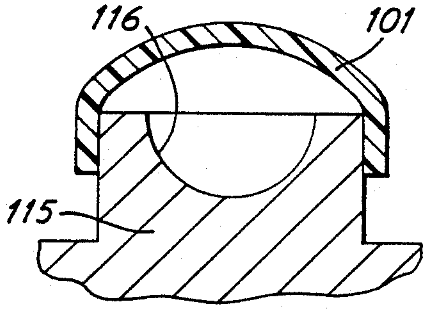

Yet further alternative constructions of passageways of multi-piece construction are shown in FIGS. 5B and 5C. FIG. 5B shows a passageway similar to that of FIG. 5A, but where the surface 116 of the ramp formation 115 is planar in cross-section. To form the passageway, a sheet of membranous material 101 is sealably affixed to the ramp formation 115 leaving an enclosed gap between the membranous sheet and the ramp. The construction of passage means illustrated in FIG. 5B is intended for use with a finger element 29 with a flat end surface.

A yet further alternative construction of passage means is shown in FIG. 5C. The surface 116 of the ramp formation 115 is similar to that shown in FIG. 5A in that it is provided with a groove. The sheet of membranous material 101 is similar to that shown in FIG. 5B, as it is domed relative to the surface 116. This particular construction of passageway is intended for use with a finger element 29 with an end profile matching that of the groove.

It will be appreciated that the surface 116 of the ramp formation 115 may be provided with other groove shapes than those illustrated in FIGS. 5A to 5C with corresponding changes to the shape of the end surface of the finger element 29.

Figure 6:
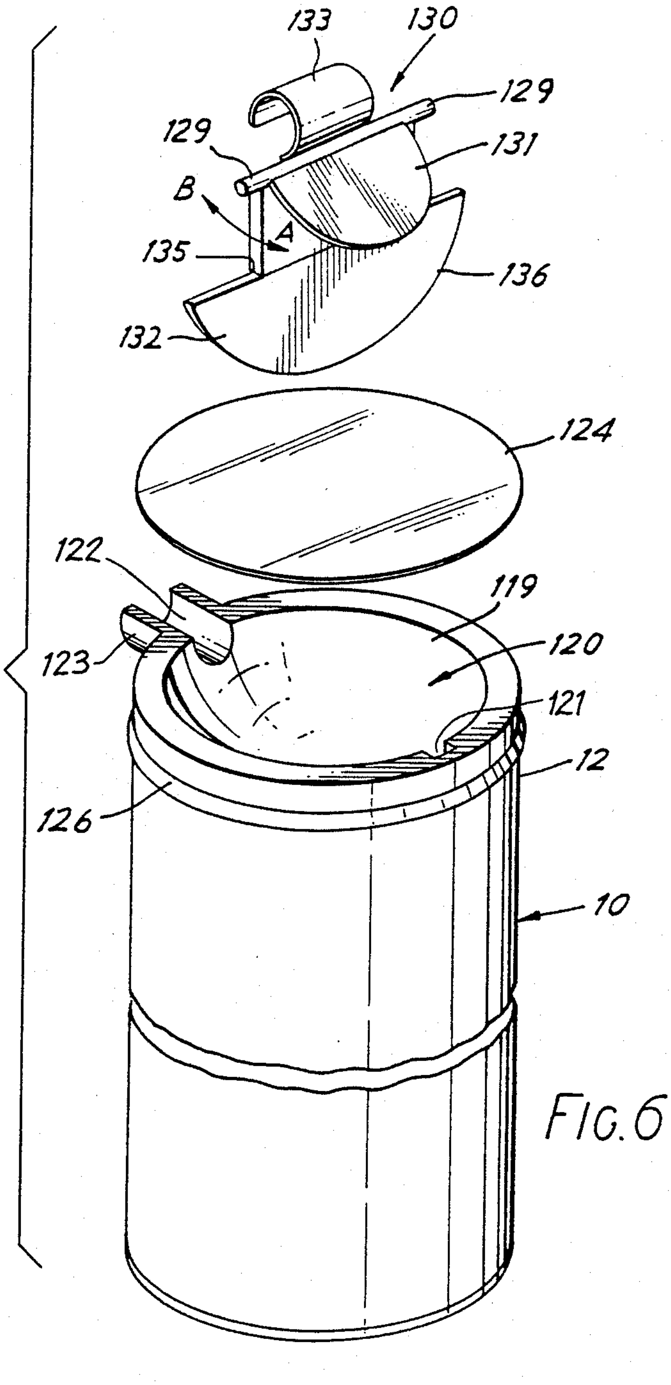
FIG. 6 is an exploded perspective view of a further embodiment of dispenser, minus the cap.

FIG. 6 shows a further embodiment of dispenser, those parts of the dispenser shown in FIG. 6 that are common to parts of the FIGS. 1 to 4 embodiment have been given the same reference numerals.

In FIG. 6 the top end of the body 10 is generally closed by a wall 119 forming a dished receptacle 120. In the illustrated embodiment the dished receptacle 120 is of hemispherical shape, however it will be appreciated that other suitable shapes, such for example as hemielliptical, may be used. This wall may be formed separately from the body 10, or integrally therewith as shown. Apertures 121 and 122 are provided in the wall and body, generally diametrically opposite one another. One aperture 121 communicated between the interior of the body and the receptacle 120. The other aperture 122 communicates between the receptacle and the exterior of the body, via a discharge port 123. As will later become apparent, product from the reservoir may be pumped into the dished receptable 120 via aperture 121, from whence it may be expelled via discharge aperture 122 and port 123.

Provided over the wall 119 is an element of membranous material 124, which is suitably deformable and resilient. The material may for example be a thermoplastic polymer or elastomer. The function of the membranous material is to generally close the receptacle 120 so that it has only two apertures 121, 122 in order to form a passageway therebetween. To retain the membranous material in position a cap (not shown) is provided thereover, which may be clipped into position on the body 10 and retained by a bead 126. The periphery of the membrane may thus be trapped between a shoulder provided on the body 10 and a further shoulder provided on the cap. It will be appreciated that the membrane may be additionally or alternatively retained by other means (not shown). Although the membranous element illustrated in FIG. 6 is planar, it will be appreciated that non-planar sheets, for example in the form of domes, may be used, which elements may be made from, for example a suitable elastomeric material.

Mounted within the cap, on stub axles 129, is a one piece actuator 130 which is provided with a finger engageable portion 131 by which it is activated. Also provided is an actuator element 132 which is at its periphery shaped to conform to the profile of the dished receptacle 120, which in the illustrated embodiment is part-spherical. The actuator is also provided with a biasing means 133 in the form of a curl of resilient material which, by cooperating with a portion (not shown) of the cap, biases the actuator in a reverse direction (arrow A in FIG. 6). In the manner illustrated in FIG. 4 the actuator 129 is provided with an integral or living hinge 135 to allow free pivotal movement of the actuator element 132 in a direction indicated by the arrow A shown in FIG. 6 relative to the remainder of the actuator. It will be appreciated that a separate finger engageable member 27 and actuator 28 arrangement shown in FIGS. 1–4 could be used to replace the integral actuator 130.

Some possible variations of the arrangement of the finger portion 29 on the actuator 26 in FIGS. 1 to 4 and of the actuator element 132 on the actuator 130 in FIG. 6 are shown in FIGS. 7A and 7B, which correspond to FIG. 4 insofar as their time relation to the operation of the dispenser of FIGS. 1 to 3 is concerned. Whereas the finger portion of FIGS. 1 to 4 is essentially rigid but attached by an integral hinge, in FIG. 7A the finger portion is flexible and resilient, but backed by an abutment 51. During each resetting stroke of the dispenser, i.e., as shown in FIG. 7A, the finger portion 29 moves away from the abutment and so its whole length is free to flex and allow the finger portion to ride freely along the tube 24. However, during a dispensing stroke of the dispenser the finger portion 29 is forced back against the abutment and only a limited part at the free end of the finger portion is able to flex; the finger portion therefore presents the substantial rigidity required for it to achieve dispensing.

When the finger portion leaves the tube 24 towards the end of a resetting stroke, the natural resilience of the material of the finger portion causes the finger portion to spring back to its initial position against the abutment 51 in preparation for the next dispensing stroke; lost motion at the beginning of the dispensing stroke is therefore minimised.

In FIG. 7B the finger portion 29 is rigid and attached by an integral hinge 30. Pivotal movement at the hinge during a dispensing stroke is prevented by an abutment 51 similar to that of FIG. 7A. However, during a resetting stroke the finger portion is free to move away from the abutment, and so can ride freely along the tube

We claim:

1. A peristaltic action dispenser which comprises a container body having a first end and a second end and defining a chamber therein for containing a flowable medium, said first end having an opening therein, channel means which communicates with said opening in said first end of said container body and through which said flowable medium can flow for discharge from the chamber in said container body, said channel means including at least a portion which is flexible, and a thermoplastic actuator means for causing flowable medium in the chamber in said container body to flow through said channel means for discharge from said container body, said actuator means including an actuating element located on one side of said channel means and which includes (a) a base portion that is pivotally movable from a rest position in a first direction away from said rest position or an opposite second direction back to said rest position, and (b) a tip portion which is connected to said base portion by an integral hinge, said base portion and said tip portion defining respective confronting surfaces, said confronting surfaces contacting one another to cause said tip portion to be rigidly supported by said base portion when said base portion is moved in said first direction, such that said tip portion will frictionally contact and deform said flexible portion of said channel means and cause flowable medium to flow through said channel means for discharge from said container body, whereas when said base portion is moved in said second direction, said tip portion will pivot relative to said base portion and said confronting surfaces will not be in contact, such that said tip portion will slide over said flexible portion of said channel means, and bias means connected to said base portion of said actuating element to bias said base portion so as to pivot in said second direction, and a finger-engageable means for applying an operating force to said base portion of said actuating element in order to pivot said base portion in said first direction.

2. A peristaltic action dispenser according to claim 1, including a container cap attached to said first end of said container body, and wherein said base portion of said actuating finger is pivotally mounted within said container cap.

3. A peristaltic action dispenser according to claim 2, wherein said finger-engageable member comprises an elongated element which extends through an opening in said container cap and is linearly movable into and out of said container cap.

4. A peristaltic action dispenser according to claim 3, wherein said biasing means comprises a tongue which is integral with said base portion of said actuating element and abuts against said container cap.

5. A peristaltic action dispenser according to claim 4, wherein said first end of said container body provides a curved ramp, wherein said channel means comprises a flexible tube which extends from an inler end located in the interior of said container body, through said opening in the first end of said container body, over said curved ramp, and to an outlet end located externally of said container cap, and wherein said tip portion of said actuating element contacts said flexible tube on a side thereof opposite said curved ramp.

6. A peristaltic action dispenser according to claim 5, wherein said tip portion of said actuating element is rigid.

7. A peristaltic action dispenser according to claim 6, wherein said tip portion has a triangular cross section having a top face which forms said confronting surface thereof and said base portion has a bottom edge which forms said confronting surface thereof.

8. A peristaltic action dispenser according to claim 5, wherein said tip portion of said actuating element is flexible.

9. A peristaltic action dispenser according to claim 4, wherein said first end of said container body provides a curved ramp which extends to said opening in said first end of said container body, and wherein a flexible membrane covers said ramp, said ramp and said flexible membrane providing said channel means.

10. A peristaltic action dispenser according to claim 9, wherein said ramp is planar in cross section.

11. A peristaltic action dispenser according to claim 9, wherein said ramp includes a groove therein.

12. A peristaltic action dispenser according to claim 1, wherein said base portion is rigid.

* * * * *

UNITED STATES PATENT AND TRADEMARK OFFICE
CERTIFICATE OF CORRECTION

PATENT NO. : 4,830,227

DATED : May 16, 1989

INVENTOR(S) : Martin F. Ball et al.

It is certified that error appears in the above-identified patent and that said Letters Patent is hereby corrected as shown below:

On the title page Insert

-- [30] Foreign Application Priority Data

November 9, 1985 Great Britain .......... 8527714 --.

Signed and Sealed this

Twenty-fourth Day of October, 1989

*Attest:*

DONALD J. QUIGG

*Attesting Officer* *Commissioner of Patents and Trademarks*